(12) United States Patent
Flockhart et al.

(10) Patent No.: US 7,949,121 B1
(45) Date of Patent: May 24, 2011

(54) METHOD AND APPARATUS FOR THE SIMULTANEOUS DELIVERY OF MULTIPLE CONTACTS TO AN AGENT

(75) Inventors: Andrew D. Flockhart, Thornton, CO (US); Gary Edward Olmsted, Ashby, MA (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 619 days.

(21) Appl. No.: 11/069,739

(22) Filed: Mar. 1, 2005

Related U.S. Application Data (60) Provisional application No. 60/613,995, filed on Sep. 27, 2004.

(51) Int. Cl.
*H04M 3/00* (2006.01)
*H04L 12/28* (2006.01)

(52) U.S. Cl. ............... 379/265.02; 370/352; 370/901

(58) Field of Classification Search .............. 379/88.1, 379/265.02; 370/352
See application file for complete search history.

(56) References Cited

U.S. PATENT DOCUMENTS

| | | |
|---|---|---|
| 4,163,124 A | 7/1979 | Jolissaint |
| 4,389,400 A | 6/1983 | Ho |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |

(Continued)

FOREIGN PATENT DOCUMENTS

CA 2143198 1/1995

(Continued)

OTHER PUBLICATIONS

U.S. Appl. No. 09/420,912, filed Oct. 20, 1999, J.A. Ford.

(Continued)

*Primary Examiner* — Evens J Augustin
(74) *Attorney, Agent, or Firm* — Sheridan Ross P.C.

(57) ABSTRACT

A contact center 100 including a grouping agent 232 that is operable to (a) select a first work item 308*a,* 312*a,* 316*a,* or 320*a* for servicing by a contact center resource; (b) determine whether the first work item is related to a second work item 308*b,* 312*b,* 316*b,* or 320*b*; and (c) when the first work item is related to the second work item, create, for servicing by the contact center resource, a first work item grouping comprising the first and second work items.

37 Claims, 5 Drawing Sheets

U.S. PATENT DOCUMENTS

| | | |
|---|---|---|
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,590,188 A | 12/1996 | Crockett |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,901,214 A | 5/1999 | Shaffer et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,941,983 A | 8/1999 | Gupta et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,058,179 A | 5/2000 | Shaffer et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,097,885 A | 8/2000 | Rayner |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,363,411 B1 * | 3/2002 | Dugan et al. .................. 709/202 |
| 6,366,666 B2 | 4/2002 | Bengtson et al. |

| Patent | Date | Inventor |
|---|---|---|
| 6,366,668 B1 | 4/2002 | Borst et al. |
| 6,373,836 B1 * | 4/2002 | Deryugin et al. ............ 370/352 |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,487,290 B1 | 11/2002 | Le Grand |
| 6,490,350 B2 | 12/2002 | McDuff et al. |
| 6,519,570 B1 | 2/2003 | Faber et al. |
| 6,535,600 B1 | 3/2003 | Fisher et al. |
| 6,535,601 B1 | 3/2003 | Flockhart et al. |
| 6,546,087 B2 | 4/2003 | Shaffer et al. |
| 6,553,114 B1 | 4/2003 | Fisher et al. |
| 6,556,974 B1 | 4/2003 | D'Alessandro |
| 6,560,329 B1 | 5/2003 | Draginich et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,584,191 B1 | 6/2003 | McPartlan et al. |
| 6,587,831 B1 | 7/2003 | O'Brien |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,636,598 B1 | 10/2003 | Thomson et al. |
| 6,639,982 B1 | 10/2003 | Stuart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,687,257 B1 | 2/2004 | Balasubramanian |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,711,255 B2 | 3/2004 | Berrondo et al. |
| 6,714,643 B1 | 3/2004 | Gargeya et al. |
| 6,718,330 B1 | 4/2004 | Zenner |
| 6,724,884 B2 | 4/2004 | Jensen et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,748,414 B1 | 6/2004 | Bournas |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,772,202 B2 | 8/2004 | Wright |
| 6,775,377 B2 | 8/2004 | McIllwaine et al. |
| 6,785,666 B1 | 8/2004 | Nareddy et al. |
| 6,801,520 B2 | 10/2004 | Philonenko |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,850,613 B2 | 2/2005 | McPartlan et al. |
| 6,859,529 B2 | 2/2005 | Duncan et al. |
| 6,898,190 B2 | 5/2005 | Shtivelman et al. |
| 6,915,305 B2 | 7/2005 | Subramanian et al. |
| 6,937,993 B1 | 8/2005 | Gabbita et al. |
| 6,947,988 B1 | 9/2005 | Saleh |
| 6,968,052 B2 | 11/2005 | Wullert, II |
| 6,968,509 B1 | 11/2005 | Chang et al. |
| 6,970,554 B1 | 11/2005 | Peterson et al. |
| 6,970,829 B1 | 11/2005 | Leamon |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,013,344 B2 | 3/2006 | Megiddo |
| 7,020,254 B2 | 3/2006 | Phillips |
| 7,023,979 B1 | 4/2006 | Wu et al. |
| 7,039,176 B2 | 5/2006 | Borodow et al. |
| 7,043,007 B2 | 5/2006 | McPartlan et al. |
| 7,047,192 B2 | 5/2006 | Poirier |
| 7,050,566 B2 | 5/2006 | Becerra et al. |
| 7,062,031 B2 | 6/2006 | Becerra et al. |
| 7,068,775 B1 | 6/2006 | Lee |
| 7,072,966 B1 | 7/2006 | Benjamin et al. |
| 7,076,051 B2 | 7/2006 | Brown et al. |
| 7,085,367 B1 * | 8/2006 | Lang ........................ 379/265.06 |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,133,520 B1 | 11/2006 | Doyle et al. |
| 7,136,873 B2 | 11/2006 | Smith et al. |
| 7,142,666 B1 | 11/2006 | Bates et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,246,371 B2 | 7/2007 | Diacakis et al. |
| 7,254,641 B2 * | 8/2007 | Broughton et al. ........... 709/240 |
| 7,257,597 B1 | 8/2007 | Pryce et al. |
| 7,266,508 B1 | 9/2007 | Owen et al. |
| 7,269,253 B1 | 9/2007 | Wu et al. |
| 7,272,223 B2 | 9/2007 | McCormack et al. |
| 7,283,805 B2 | 10/2007 | Agrawal |
| 7,295,669 B1 | 11/2007 | Denton et al. |
| 7,299,259 B2 | 11/2007 | Petrovykh |
| 7,346,532 B2 | 3/2008 | Kusama et al. |
| 7,372,857 B1 | 5/2008 | Kappler et al. |
| 7,372,952 B1 | 5/2008 | Wu et al. |
| 7,373,309 B2 | 5/2008 | Nishikawa et al. |
| 7,376,127 B2 | 5/2008 | Hepworth et al. |
| 7,392,402 B2 | 6/2008 | Suzuki |
| 7,406,098 B2 | 7/2008 | Taneja et al. |
| 7,409,423 B2 | 8/2008 | Horvitz et al. |
| 7,418,093 B2 | 8/2008 | Knott et al. |
| 7,418,094 B2 | 8/2008 | Golitsin et al. |
| 7,478,051 B2 | 1/2009 | Nourbakhsh et al. |
| 7,526,440 B2 | 4/2009 | Walker et al. |
| 7,545,925 B2 | 6/2009 | Williams |
| 7,551,602 B2 | 6/2009 | Whitman, Jr. |
| 7,567,653 B1 | 7/2009 | Michaelis |
| 7,734,032 B1 * | 6/2010 | Kiefhaber et al. ....... 379/265.01 |
| 2001/0011228 A1 | 8/2001 | Shenkman |
| 2001/0040887 A1 * | 11/2001 | Shtivelman et al. .......... 370/352 |
| 2001/0056349 A1 | 12/2001 | St. John |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0012186 A1 | 1/2002 | Nakamura et al. |
| 2002/0019829 A1 | 2/2002 | Shapiro |
| 2002/0021307 A1 | 2/2002 | Glenn et al. |
| 2002/0029213 A1 | 3/2002 | Borissov et al. |
| 2002/0035605 A1 | 3/2002 | McDowell et al. |
| 2002/0038422 A1 | 3/2002 | Suwamoto et al. |

| | | | |
|---|---|---|---|
| 2002/0065894 A1 | 5/2002 | Dalal et al. | |
| 2002/0076010 A1 | 6/2002 | Sahai | |
| 2002/0085701 A1 | 7/2002 | Parsons et al. | |
| 2002/0087630 A1 | 7/2002 | Wu | |
| 2002/0112186 A1 | 8/2002 | Ford et al. | |
| 2002/0116336 A1 | 8/2002 | Diacakis et al. | |
| 2002/0116461 A1 | 8/2002 | Diacakis et al. | |
| 2002/0194002 A1 | 12/2002 | Petrushin | |
| 2003/0016812 A1 | 1/2003 | Rodenbusch et al. | |
| 2003/0026414 A1* | 2/2003 | Baker et al. | 379/265.13 |
| 2003/0028621 A1 | 2/2003 | Furlong et al. | |
| 2003/0073440 A1 | 4/2003 | Mukherjee et al. | |
| 2003/0093465 A1 | 5/2003 | Banerjee et al. | |
| 2003/0095652 A1 | 5/2003 | Mengshoel et al. | |
| 2003/0108186 A1 | 6/2003 | Brown et al. | |
| 2003/0123642 A1 | 7/2003 | Alvarado et al. | |
| 2003/0144900 A1 | 7/2003 | Whitmer | |
| 2003/0144959 A1 | 7/2003 | Makita | |
| 2003/0152212 A1 | 8/2003 | Burok et al. | |
| 2003/0154184 A1 | 8/2003 | Chee et al. | |
| 2003/0169870 A1 | 9/2003 | Stanford | |
| 2003/0174830 A1 | 9/2003 | Boyer et al. | |
| 2003/0177017 A1 | 9/2003 | Boyer et al. | |
| 2003/0177231 A1 | 9/2003 | Flockhart et al. | |
| 2003/0182310 A1 | 9/2003 | Charnock et al. | |
| 2003/0231647 A1 | 12/2003 | Petrovykh | |
| 2003/0231757 A1 | 12/2003 | Harkreader et al. | |
| 2004/0008828 A1 | 1/2004 | Coles et al. | |
| 2004/0010437 A1 | 1/2004 | Kiran et al. | |
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0103324 A1 | 5/2004 | Band | |
| 2004/0138944 A1 | 7/2004 | Whitacre et al. | |
| 2004/0141508 A1* | 7/2004 | Schoeneberger et al. | 370/401 |
| 2004/0162998 A1 | 8/2004 | Tuomi et al. | |
| 2004/0202309 A1 | 10/2004 | Baggenstoss et al. | |
| 2004/0210475 A1 | 10/2004 | Starnes et al. | |
| 2004/0230675 A1 | 11/2004 | Freimuth et al. | |
| 2004/0260706 A1 | 12/2004 | Anonsen et al. | |
| 2005/0004828 A1 | 1/2005 | deSilva et al. | |
| 2005/0013428 A1 | 1/2005 | Walters | |
| 2005/0021529 A1 | 1/2005 | Hodson et al. | |
| 2005/0041580 A1 | 2/2005 | Petrovykh | |
| 2005/0044375 A1 | 2/2005 | Paatero et al. | |
| 2005/0065837 A1 | 3/2005 | Kosiba et al. | |
| 2005/0091071 A1 | 4/2005 | Lee | |
| 2005/0125276 A1* | 6/2005 | Rusu | 705/9 |
| 2005/0125432 A1 | 6/2005 | Lin et al. | |
| 2005/0125458 A1 | 6/2005 | Sutherland et al. | |
| 2005/0129212 A1 | 6/2005 | Parker | |
| 2005/0135593 A1 | 6/2005 | Becerra et al. | |
| 2005/0135600 A1 | 6/2005 | Whitman | |
| 2005/0135601 A1 | 6/2005 | Whitman | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0045255 A1* | 3/2006 | Peters et al. | 379/265.09 |
| 2006/0056598 A1 | 3/2006 | Brandt et al. | |
| 2006/0135058 A1 | 6/2006 | Karabinis | |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2008/0275751 A1 | 11/2008 | Flockhart et al. | |
| 2008/0275752 A1 | 11/2008 | Flockhart et al. | |
| 2008/0275766 A1 | 11/2008 | Flockhart et al. | |
| 2009/0193050 A1 | 7/2009 | Olson | |

FOREIGN PATENT DOCUMENTS

| | | |
|---|---|---|
| CA | 2174762 | 3/1996 |
| EP | 0 501 189 A2 | 9/1992 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 9/1998 |
| EP | 0 863 651 A2 | 9/1998 |
| EP | 0 866 407 A1 | 9/1998 |
| EP | 0 899 673 A2 | 3/1999 |
| EP | 0 998 108 A1 | 5/2000 |
| EP | 1035718 | 9/2000 |
| EP | 1075130 | 2/2001 |
| EP | 1 091 307 A2 | 4/2001 |
| EP | 1 150 236 A2 | 10/2001 |
| EP | 1246097 | 10/2002 |
| GB | 2 273 418 | 6/1994 |
| GB | 2 290 192 A | 12/1995 |
| JP | 06-019861 | 1/1994 |
| JP | H7-005907 | 1/1995 |
| JP | 2001-053843 | 2/2001 |
| JP | 2001-077922 | 3/2001 |
| JP | 2002-297900 | 10/2002 |
| JP | 2006-054864 | 2/2006 |
| WO | WO 96/07141 | 3/1996 |
| WO | WO-97/28635 | 8/1997 |
| WO | WO 98/56207 | 12/1998 |
| WO | WO 99/17522 | 4/1999 |
| WO | WO 01/80094 | 10/2001 |
| WO | WO 01/80540 A1 | 10/2001 |
| WO | WO 02/099640 | 12/2002 |

OTHER PUBLICATIONS

U.S. Appl. No. 10/673,103, filed Sep. 26, 2003, Flockhart et al.
U.S. Appl. No. 10/673,105, filed Sep. 26, 2003, Flockhart et al.
U.S. Appl. No. 10/673,115, filed Sep. 26, 2003, Flockhart et al.
U.S. Appl. No. 10/673,118, filed Sep. 26, 2003, Flockhart et al.
U.S. Appl. No. 10/815,534, filed Mar. 31, 2004, Flockhart et al.
U.S. Appl. No. 10/815,566, filed Mar. 31, 2004, Kiefhaber et al.
U.S. Appl. No. 10/815,584, filed Mar. 31, 2004, Kiefhaber et al.
U.S. Appl. No. 10/861,193, filed Jun. 3, 2004, Kiefhaber et al.
U.S. Appl. No. 10/891,346, filed Jul. 13, 2004, Flockhart et al.
U.S. Appl. No. 10/946,638, filed Sep. 20, 2004, Flockhart et al.
U.S. Appl. No. 11/000,686, filed Nov. 30, 2004, Flockhart et al.
Sarah Ahmed, "A Scalable Byzantine Fault Tolerant Secure Domain Name System," thesis submitted to Massachusetts Institute of Technology, Department of Electrical Engineering and Computer Science, Jan. 22, 2001.
Avaya website entitled, "Business Advocate Product Summary," Avaya Inc. (2003) available at http://www.avaya.com, 3 pages.
Avaya website entitled, "Business Advocate Options," Avaya Inc. (2003), available at http://www.avava.com, 4 pages.
*CentreVu Advocate Release 9 User Guide*, Avaya Inc., 585-215-953, Issue 1 (Dec. 2000), pp. 1-210.
"The Advantages of Load Balancing in the Multi-Call Center Enterprise," Avaya Inc. White Paper (Feb. 2002), pp. 1-13.
"Voice Over IP Via Virtual Private Networks: An Overview," Avaya Inc. White Paper (Feb. 2001), pp. 1-8.
"Better Implementation of IP in Large Networks," Avaya Inc. Application Note (Apr. 19, 2002), pp. 1-14.
"Internet Protocol Addressing," available at http://samspade.org/d/ipdns.html, downloaded Mar. 31, 2003, 9 pages.
Bellsouth Corp. website entitled, "Frequently Asked Questions—Domain Name Service FAQs," (2002), available at https://registration.bellsouth.net/NASApp/DNSWebUI/FAQ.jsp, 4 pages.
David Chavez et al., "Avaya MultiVantage Software: Adapting Proven Call Processing for the Transition to Converged IP Networks," Avaya Inc. White Paper (Aug. 2002), pp. 1-18.
Scott Coles, "A Guide for Ensuring Service Quality in IP Voice Networks," Avaya Inc. White Paper (Jun. 2002), pp. 1-17.

Website entitled "Chapter 9—Domain Name Services," available at http://www.pism.com/chapt09/chapt09.html, downloaded Mar. 31, 2003, 21 pages.

Doo-Hyun Kim et al. "Collaborative Multimedia Middleware Architecture and Advanced Internet Call Center," Proceedings at the International Conference on Information Networking (Jan. 31, 2001), pp. 246-250.

Robin Foster et al., "Avaya Business Advocate and its Relationship to Multi-Site Load Balancing Applications," Avaya Inc. White Paper (Mar. 2002), pp. 1-13.

Presentation by Victor Zue, "The MIT Oxygen Project," MIT Laboratory for Computer Science, Cambridge, MA (Apr. 25-26, 2000), 9 pages.

MIT Project Oxygen, "Pervasive, Human-Centered Computing—Oxygen," MIT Laboratory for Computer Science, (Jun. 2000), pp. 1-15.

E. Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 8 pages.

L.F. Lamel and J.L. Gauvain, "Language Identification Using Phone-Based Acoustic Likelihoods," ICASSP-94, 4 pages.

John H.L. Hansen et al., "Foreign Accent Classificatino Using Source Generator Based Prosodic Features," Robust Speech Processing Laboratory, Duke University Department of Electrical Engineering, (undated), pp. 1-4.

Levent M. Arslan et al., "Language Accent Classification in American English," Robust Speech Processing Laboratory, Duke University Department of Electrical Engineering, Technical Report RSPL-96-7, revised Jan. 29, 1996, pp. 1-16.

Levent M. Arslan, "Foreign Accent Classification in American English," Dissertation submitted to Department of Electrical Computer Engineering, Graduate School of Duke University, (1996), pp. 1-201.

"When Talk Isn't Cheap," *Sm@rt Reseller*, v. 3, n. 13 (Apr. 3, 2000), p. 50.

"eGain's Commerce 2000 Platform Sets New Standard for eCommerce Customer Communications," *Business Wire* (Nov. 15, 1999).

Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.

U.S. Appl. No. 11/064,367, Flockhart et al.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-Athena, Section 5—Company C520, p. 95, 1992.

Dawson, "NPRI's.Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answering Resources. 6 pages.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Avaya, Inc. "Better Implementation of IP in Large Networks," Avaya, Inc. 2002, 14 pages.

Judge et al., Agent-enhanced workflow, BT Technologies Journal, vol. 16 No. 3, 1998.

Evenson et al., Effective Call Center Management: Evidence from Financial Services, The Wharton Financial Institutions Center, Jan. 1999.

Eder, Johann et al. "Time Management in Workflow Systems." BIS'99 3rd International Conference on Business Information Systems (1999).

Background of the Invention of the above-captioned application (previously provided).

Spraetz, Out with the new, in with the old: A look at scheduling alternatives, Customer Inter@ction Solutions; Nov. 2001: 20,5.

www.EIX.com (1998-2002) (http://web.archive.org/web/20020803000353/http://www.iex.com): Totalview The Workforce Management Solution, TotalView Product Literature: The Perfect Fit.

www.EIX.com (1998-2002) (http://web.archive.org/web/20020803000353/http://www.iex.com): Totalview The Workforce Management Solution, TotalView Product Literature: TotalView's Agent Webstation.

Business Editors, Microdyne Outsourcing Rolls Out RightForce Workforce Management to Manage Bi-Coastal Contact Center and E-Services Staff Business Wire. New York: Dec. 4, 2001. p. 1.

Business Editors, High Tech Editors. IEX Enhances Award-Winning Workforce Management Solution Business Wire. New York: Jul. 31, 2001. p. 1.

Morris et al., Sardine: Dynamic Seller Strategies in an Auction Marketplace, EC'OO, ACM, Oct. 17-20, 2000, p. 128-134.

Rabun, Andy and Jim Sommers "Microsoft Project 98 Support Course", Microsoft Corporation. Jun. 1998, 879 pages.

"Microsoft Project 2000 Training Manual", Microsoft Corporation. 2000, 431 pages.

U.S. Appl. No. 12/022,850, filed Jan. 30, 2008, Flockhart et al.

Microsoft Corporation. "User's Guide: Microsoft Project: Business Project Planning System Version 4.1 for Windows 95 or Version 4.0 for Windows 3.1." 1995. pp. 1-40 (Chapters 1-4).

Dinda, Peter A., "A Prediction-based Real-time Scheduling Advisor", 2002, pp. 1-8.

U.S. Appl. No. 11/199,828, filed Aug. 8, 2005, Bland et al.
U.S. Appl. No. 11/242,687, filed Oct. 3, 2005, Krimstock et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/249,916, filed Oct. 1, 2008, Kiefhaber et al.

"Avaya IQ—Building Upon the Strengths of CMS", White Paper, Feb. 2007, 11 pages.

"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.

"Driving Model Agent Behaviors With Avaya IQ", White Paper, Apr. 2007, 12 pages.

"KANA—Contact Center Support", available at http://www.kana.com/solutions.php?tid=46, copyright 2006, 3 pages.

"Monitoring: OneSight Call Statistics Monitors", available at http://www.empirix.com/default.asp?action=article&ID=301, date unknown, printed May 10, 2007, 2 pages.

"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).

"Still Leaving It to Fate?: Optimizing Workforce Management", Durr, William Jr., Nov. 2001.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Atkins et a.l; "Common Presence and Instant Messaging: Message Format," Network Working Group (Jan. 9, 2003), available at http://www.ietf. org/internet-drafts/draft-ietf-impp-cpim-msgfmt-08.txt, 31 pages.

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).

Avaya—"Avaya Basic Call Management System Reporting Desktop" (Copyright 2002) (4 pages).

Avaya—"Avaya Call Management System" (Copyright 2003) (3 pages).

Avaya—"Basic Call Management System Reporting Desktop," Product Description, http://www.avaya.com/gcm/master-usa/en-us/products/offers/bcmrs_desktop.htm (Copyright 2005) (2 pages).

Avaya—"Basic Call Management System Reporting Desktop," Product Features, http://www.avaya.com/gcm/master-usa/en-us/products/offers/bcmrs_desktop.htm (Copyright 2005) (2 pages).

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Avaya IQ "Introducing Reporting And Analytics As You Designed It", 2007, 4 pages.

Definity Communications System Generic 3 Call Vectoring/Expert Agent Selection (EAS) Guide, AT&T publication No. 555-230-520 (Issue 3, Nov. 1993).

Nortel—"Centrex Internet Enabled Call Centers," http://www.products.nortel.com/go/product_assoc.jsp?segId=0&parID=0&catID=-9191&rend_id... (Copyright 1999-2005) (1page).

US 6,537,685, 03/2003, Fisher et al. (withdrawn)

* cited by examiner

METHOD AND APPARATUS FOR THE SIMULTANEOUS DELIVERY OF MULTIPLE CONTACTS TO AN AGENT

CROSS REFERENCE TO RELATED APPLICATION

This application claims the benefits under 35 U.S.C. § 119 of U.S. Provisional Patent Application Ser. No. 60/613,995, filed Sep. 27, 2004, of the same title and to the same inventors, which is incorporated herein by this reference.

FIELD OF THE INVENTION

The present invention is directed generally to servicing a contactor in a contact center and specifically to allocating work items among contact center resources.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Agents with a higher skill are normally preferred over agents with lower skill levels when assigning an agent to a contact. When agents have multiple skills, the controller is more likely to select a contact for which the agent has a high skill level over a contact for which the agent has a lesser skill level. Generally, the only condition that results in a contact not being delivered to an available agent is that there are no contacts waiting to be handled.

Most present-day contact-distribution algorithms focus on being "fair" to contactors and to agents. This fairness is reflected by the standard first-in, first-out contact to most-idle-agent assignment algorithm. Skills-based routing improves upon this basic algorithm in that it allows each agent to be slotted into a number of agent groups based on the agent's skill types and levels.

An ongoing problem in skills-based routing contact centers is how to handle multiple contacts from a customer efficiently and effectively. Today, contact centers allow customers to communicate with an enterprise at any time and over any media channel of their choosing and seek to provide a consistent interface to customers regardless of what enterprise representative or media channel is involved. For example, a customer can communicate with the contact center using any combination of circuit-switched voice calls, Voice over IP or VoIP, email, Web chat, instant messaging, and the like. As a result, when a contact is delivered to an agent, contact center queuing structures can contain additional contacts from that customer, which are waiting to be serviced and which may or may not be relevant to the delivered contact. By way of illustration, a customer might place an order by email, follow the order up by a second email requesting a change to the quantity ordered, follow up the second email with a third email to change the shipping address, and follow up the third email with a voice call to confirm the status of the changed order. Notwithstanding such events, resource allocation systems typically deliver customer contacts to agents one-at-a-time. Multiple customer contacts can thus be handled inconsistently or, possibly, even in a conflicting manner by multiple company representatives. This is not only an inefficient way for the company to operate but also a frustrating experience for customers.

Some systems allow agents to have multiple simultaneous work assignments and/or provide the ability for an agent to view or search for such unprocessed contacts. Such systems, however, neither allow the agent to process simultaneously the additional pending contacts nor provide for the simultaneous delivery of the contacts to the same agent as a related grouping of work items.

SUMMARY OF THE INVENTION

These and other needs are addressed by the various embodiments and configurations of the present invention. The present invention is directed generally to a resource allocation system and method that allows the agent to process simultaneously the additional pending contacts and/or provides for the simultaneous delivery of the contacts to the same agent as a related grouping of work items.

In a first embodiment, a method for servicing work items in a contact center is provided. The steps of the method include:

(a) selecting a first work item for servicing by a contact center resource;

(b) determining whether the first work item is related to a second work item; and (c) when the first and second work items are related, creating, for servicing by the contact center resource, a first work item grouping including the first and second work items.

The work item can be any item of work for a contact center resource. Typically, a work item is a contact, such as a voice call, an email, a facsimile, a voice message, an instant message, and Web chat.

The servicing resource can be any contact center resource, such as a human agent, an automated attendant, and an Interactive Voice Recognition unit or IVR.

The determination of whether the first and second work items are related is commonly made using one or more selected qualifiers. When the first and second work items have the qualifier(s) in common, they are deemed to be related. Exemplary qualifiers include customer identity, intent, media type, subject, and transaction identifier.

In one configuration, a work item grouping table is maintained to facilitate grouping of related work items. The work item grouping table maps grouping or sets of pending work items against one or more designated qualifiers, such as a customer identifier.

In an exemplary configuration, when a work item is delivered to an agent additional unprocessed related contacts, typically from the same customer, are also delivered simultaneously to the agent. Contacts having the same intent are deemed to be related. By way of illustration, an enterprise has, from the same customer, a voice call concerning auto insurance, two emails concerning auto insurance, and two emails concerning vacation packages. When the call is delivered to an agent, the agent will also get, at the same time, the two emails concerning auto insurance. The agent may then choose to process the additional contacts or return them to their original queues if he feels that they should be processed separately.

The present invention can have a number of advantages relative to the prior art. For example, the present invention, by delivering all related contacts to the same agent for processing, can ensure that the customer transaction is handled in a consistent, effective, and much more efficient manner. The invention addresses in a meaningful way the contact center operational problems associated with the multi-media nature of today's contact centers.

These and other advantages will be apparent from the disclosure of the invention(s) contained herein.

The above-described embodiments and configurations are neither complete nor exhaustive. As will be appreciated, other embodiments of the invention are possible. utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
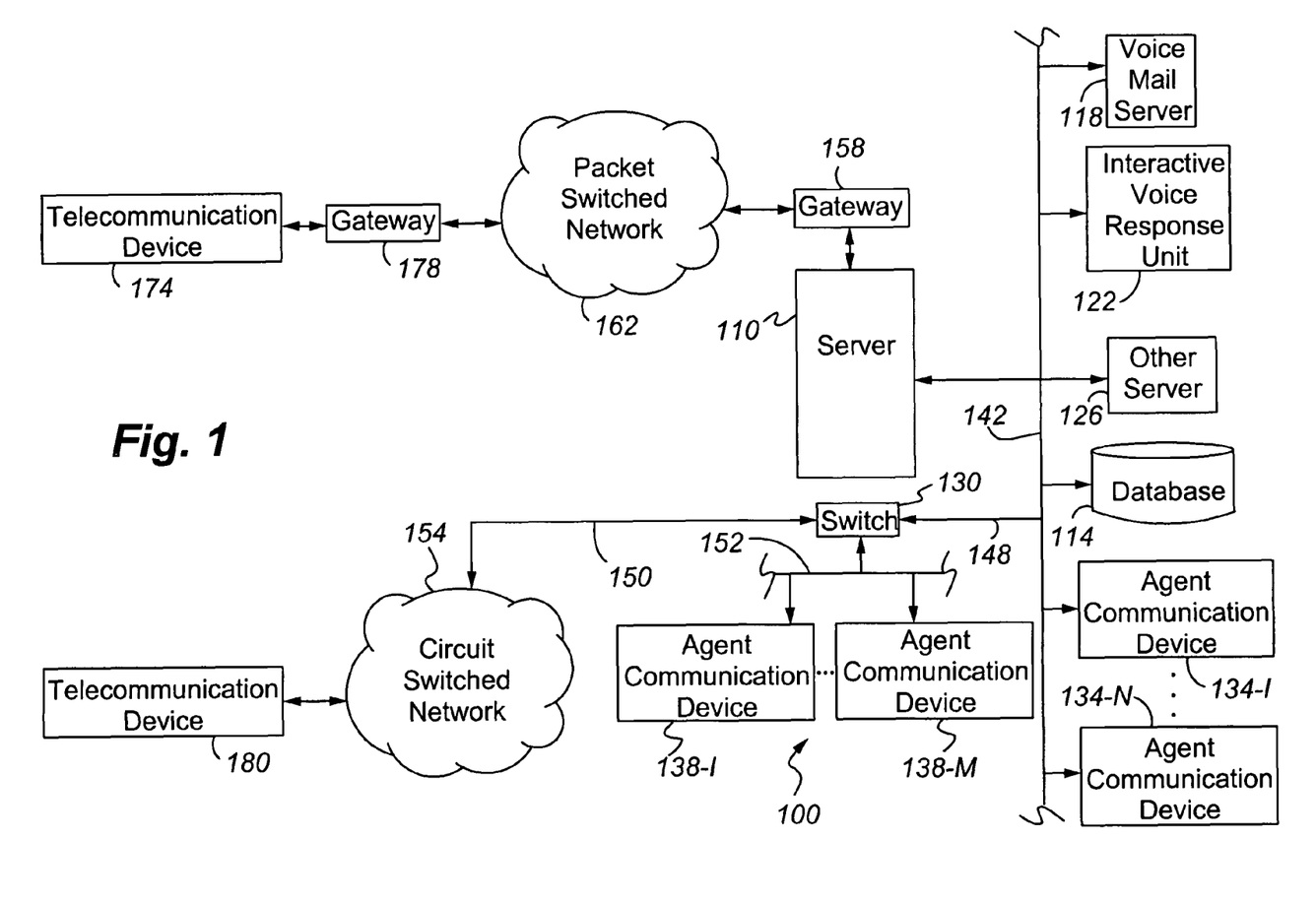
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Figure 2:
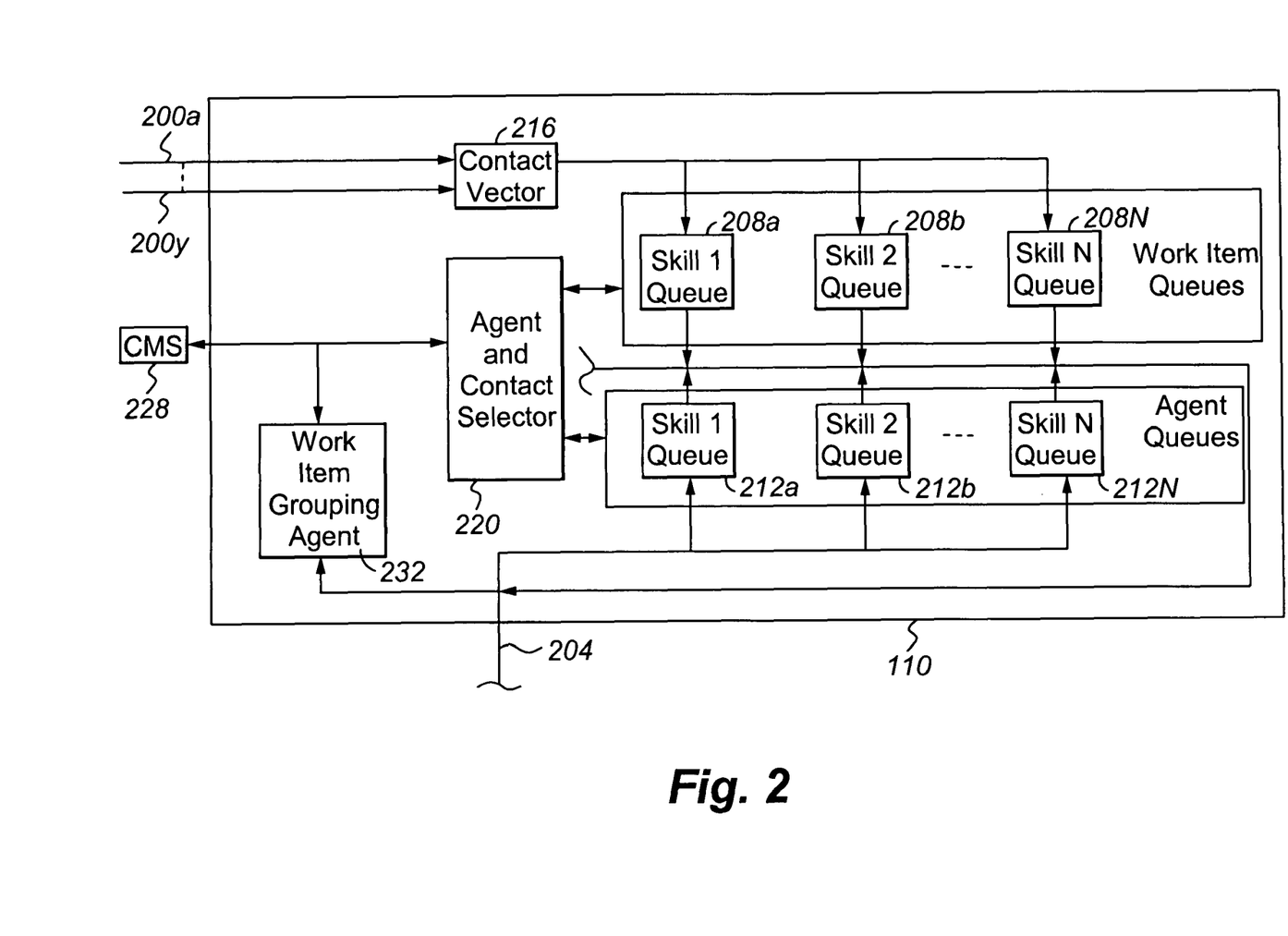
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 152). The server 110 can include Avaya Inc.'s an Operational Analyst™ or OA with On-Line Analytical Processing or OLAP technology or a Call Management System or CMS 228 that gathers contact records and contact-center statistics for use in generating contact-center reports. OA and CMS will hereinafter be referred to jointly as CMS 228.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™, IP600™ or S8700™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and either are enqueued in individual ones of the work item queues 208a-n in their order of priority or are enqueued in different ones of a plurality of work item queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a work item vector 216. Contacts incoming to the contact center are assigned by work item vector 216 to different work item queues 208a-n based upon one or more work item qualifiers. As used herein, a qualifier refers to an attribute assigned to a contact that determines, at least in part, to which work item queue 208 the corresponding contact is forwarded (or to which class of service the contact is assigned). Examples of qualifiers include contactor attributes (identity, language, socioeconomic status, customer value to the contact center, business history with the enterprise operating the contact center, and geographic region), contact attributes (e.g., communication channel or media, and subject), contactor needs (e.g., type or nature of contact, purpose of contact, and intent of contact), contact center needs (e.g., current work item center queue lengths), and agent skill required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring, one type of work item routing, is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700™, G600™, MCC/SCC™ media gateway and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact (or first work item) to an agent, the central server 110 also forwards customer-related information from databases 114 to the agent's computer work station for viewing (such as by a pop-up display) to permit the agent to better serve the customer. Depending on the contact center configuration, the central server may forward a list of work items and/or groupings of work items to an available agent to preview before forwarding the contact itself and the data associated therewith to the agent. The agents process the contacts or work items sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Agent and customer profiles are typically maintained and updated by a profile generator (not shown). Upon the completion of handling a contact, the generator collects selected metrics for the contact. These metrics include the skill involved in servicing the contact, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the contact, the rating of the customer of the agent's proficiency in handling the contact, the rating of another party, such as the agent's supervisor or another observer, of how the contact was serviced, whether the agent requested assistance, and whether the agent's training was completed, and stores the information in the database 114, such as CMS 228. The metrics over a selected period of time are typically stored under each agent's profile. Each agent profile typically includes metrics associated with a plurality of contacts serviced by the agent for each agent skill, and each customer profile includes metrics associated with a plurality of contacts by the customer.

According to the invention, included among the programs executing on the server 110 are an agent and work item selector 220 and work item grouping agent 232. The selector 220 and grouping agent 232 are stored either in the main memory or in a peripheral memory (e.g., disk, CD ROM, etc.) or some other computer-readable medium of the center 100. The selector 220 and agent 232 collectively effect an assignment between sets of related work items and available agents in a way that tends to maximize contact center efficiency. The grouping agent 232 can assist the work item vector 216 in routing sets of related work items to the appropriate queue 208 and/or the selector 220 in routing a set of related work items to a most desirable agent in the queue 212. The grouping agent 232, in particular, selects one or more work item qualifiers as defining relatedness and groups, into the same set, the work items having the same shared qualifier. Although not always the case, a typical set of work items contains at least one real-time contacts and/or non-real-time contacts. For example, the shared qualifier can be customer identity and/or the purpose or intent of the work item. The purpose or intent of the work item can be determined by techniques known to those of ordinary skill in the art, such as by identifying a transaction identifier (such as ticket or matter number, order number, and the like), using an automated attendant such as an IVR, using text searching through a text communication such as email, using the electronic address or telephone number inputted by the customer, and using the Web page Universal Resource Locator or URL from which the customer requested contact center servicing or otherwise initiated the pending contact with the contact center. The selector 220 uses predefined criteria and/or a routing algorithm in selecting an appropriate agent to service individual work items and/or sets of work items.

The agent 232 may group related work items when a work item is received, during the time that a work item is enqueued and waiting to be serviced, when a work item is at the head of a queue and ready to be assigned to an agent, and/or when an agent becomes available to service the work item. At any of these points, the agent 232 determines if the work item is already part of a set of work items and, if not, whether the work item should be part of a set of work items.

Figure 3:
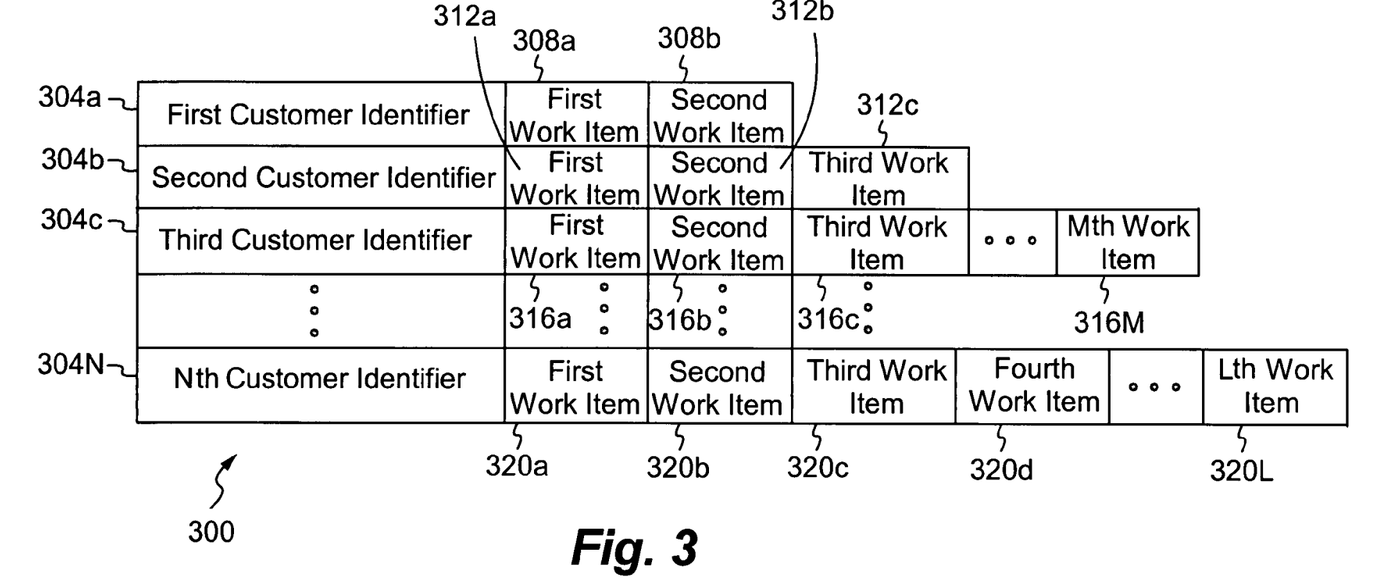
FIG. 3 is a work item grouping table mapping sets or groupings of related pending work items against one or more shared qualifiers for an embodiment of the present invention.

The instances of sets or groupings of work items are typically tracked using a work item grouping table (stored in the database 114) of the type shown in FIG. 3. Referring to FIG. 3, the table 300 includes, along the vertical axis, customer identifier, such as the first customer identifier 304*a*, second customer identifier 304*b*, third customer identifier 304*c*, . . . Nth customer identifier 304*n*, and, along the horizontal axis, the work item groupings or sets related to each customer identifier. The work items in the table are typically identified by a pointer to the particular location where information related to the work item is maintained. For example, the first customer identifier 304*a* has only two related work items, namely first and second work items 308*a* and *b*, the second customer identifier 304*b* has only three related work items, namely first, second, and third work items 312*a-c*, the third customer identifier 304*c* has M related work items, namely first, second, third, . . . Mth work items 316*a-m*, and the Nth customer identifier 304*n* has L related work items, namely first, second, third, . . . Lth work items 320*a-l*. As will be appreciated, the customer identifier can be replaced by one or more other qualifiers, such as customer purpose, subject or need, media-type or channel, and the like. Although the table 300 is depicted as being two-dimensional, one of ordinary skill in the art will readily appreciate that it can have more than two dimensions, depending on the application. As will be further appreciated, not only can there be a different work item grouping table for a grouping of agents but also each enterprise department or business segment, can have a different work item grouping table (e.g., a sales department versus a service or customer help department).

The term "stored list" or "table" should be understood to include any ordered set of information or data stored in memory or other storage device accessible to the switch and/or server. The invention does not require that the information be stored in any particular length or format, e.g., a tabular format, a closed- or open-set, and numerous suitable storage formats will be readily apparent to those skilled in the art.

As will be appreciated, though a pending work item is, at any one time, typically a member of only one work item set or grouping the present invention is not so limited. It is possible that the same work item is simultaneously a member of two or more work item sets or groupings. This can result, for example, when multiple different work item grouping tables are maintained, each having a different set of shared qualifiers. This may happen when differing agent queues 212 or enterprise business segments use differing sets of shared qualifiers. For example, a first agent queue 212 or enterprise business segment may use customer identity in identifying work item groupings while a second agent queue 212 or enterprise business segment may use work item intent in identifying work item groupings. The latter situation is particularly appropriate where a group of different customer contacts will be serviced simultaneously by the same agent, such as in a group chat or chat room setting. When a work item is simultaneously a member of multiple work item sets, it is commonly removed as a member from other work item sets when the first work item set of which it is a member is assigned to an agent for servicing.

Figure 4:
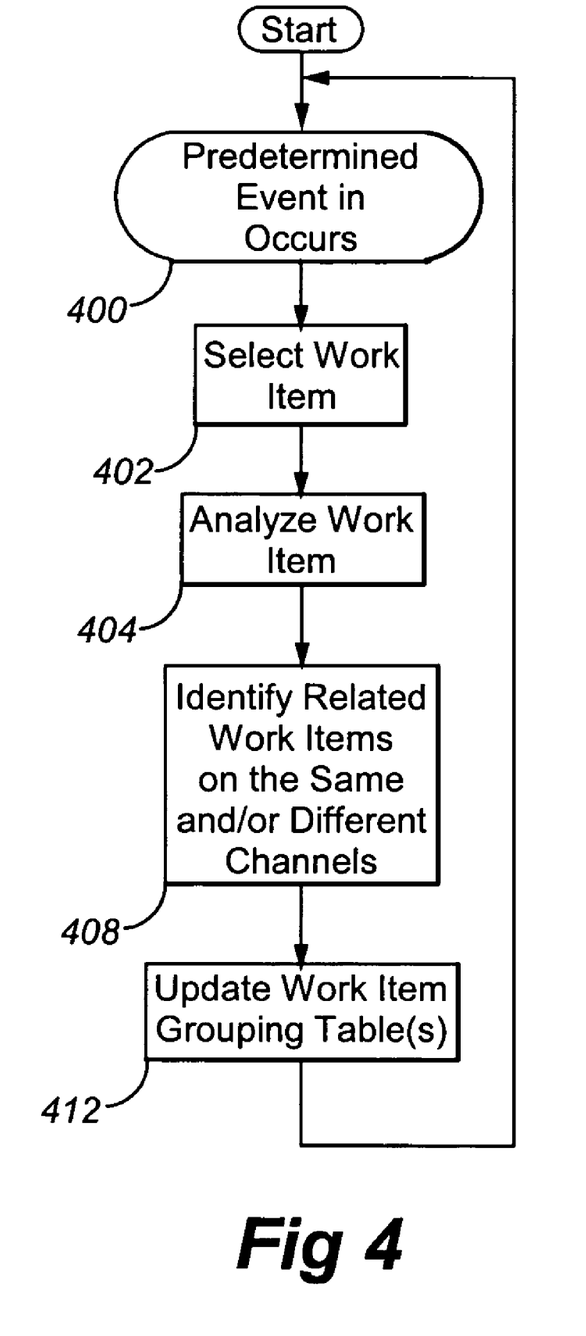
FIG. 4 is a flow chart depicting an operational embodiment of the work item grouping agent according to an embodiment of the present invention.

The operation of the agent 232 will now be described with reference to FIG. 4.

In step 400, a predetermined event occurs. This event may be the receipt by the contact center 100 of a new contact or work item (which is the preferred configuration). It may be the placement of a new work item in a work item queue 208. It may be the arrival of a work item at the head of a work item queue 208. It may be the availability of an agent in an agent queue 212 to service a work item at the head of a work item queue 208.

In step 402, the agent 232 selects a work item for analysis. When the event is the receipt by the contact center 100 of a new contact or work item, the work item selected is the new work item. When the event is the placement of a new work item in a work item queue 208, the work item selected is the placed work item. When the event is the arrival of a work item at the head of a work item queue 208 or the availability of an agent in an agent queue 212 to service a work item at the head of a work item queue 208, the work item selected is the work item at the head of the work item queue 208.

In step 404, the agent 232 analyzes the selected work item. Typically, the analysis is performed by searching for one or more selected qualifiers from among the plurality of qualifiers previously assigned by the vector 216 to the work item.

In step 408, the agent 232 uses the results of step 404 to identify related work items on the same and/or different channels. When the search of step 404 identifies one or more selected qualifiers, the work item is identified as being a member of the existing grouping of work items sharing the selected qualifiers. When the search of step 404 fails to identify a selected qualifier, the work item is not placed in an existing grouping of work items. In one configuration, when no existing grouping is identified the agent 232 searches other pending enqueued contacts for the selected qualifier(s). If located, the selected work item and other identified work items are placed in a new grouping of work items.

In step 412, the work item grouping table is updated to reflect the results of step 408.

As will be appreciated, work items can be terminated by a customer before servicing by a contact center resource. In that event, the agent 232 will receive an interrupt from another contact center component or module to remove that work item from the grouping table.

The agent 232 then returns to step 400 to await the next occurrence of the predetermined event.

The operation of the selector 220 will now be described with reference to FIG. 5.

In decision diamond 500, the selector 220 waits for an agent in an agent queue 212 to become available to service a pending work item.

In step 504, the selector 220, when an agent becomes available, selects a best work item for the agent to service. This selection process can be done according to any suitable selection algorithm known to those of ordinary skill in the art.

In step 508, the selector 508 determines the customer associated with the selected work item.

In step 512, the selector 220 looks up the work item grouping table and finds all additional work items, if any, from the customer associated with the selected work item In optional step 516, the selector 220 eliminates all work items from the work item grouping that do not have the same intent. This step is not performed in contact center configurations that wish the same agent to handle all existing pending work items associated with a given customer. Work item filtration criteria other than or besides intent can be employed to remove work items from the grouping. For example, work items on selected media can be removed in the event that the agent is neither configured nor trained to handle certain media types.

In step 520, the work items remaining in the work item grouping are simultaneously or near simultaneously delivered to the selected agent for servicing.

In step 524, the selector 220 causes the agent 232 to remove the delivered work item grouping from the grouping table 300 and each individual member of the grouping as a member of any other work item grouping in the grouping table 300. For example if the delivered first work item grouping includes a first work item that is also a member of a pending (unserviced) second work item grouping, the agent 232 removes the first work item from the listing of work items corresponding to the second work item grouping.

The selector 220 then returns to step 500 to await the next agent becoming available.

Figure 5:
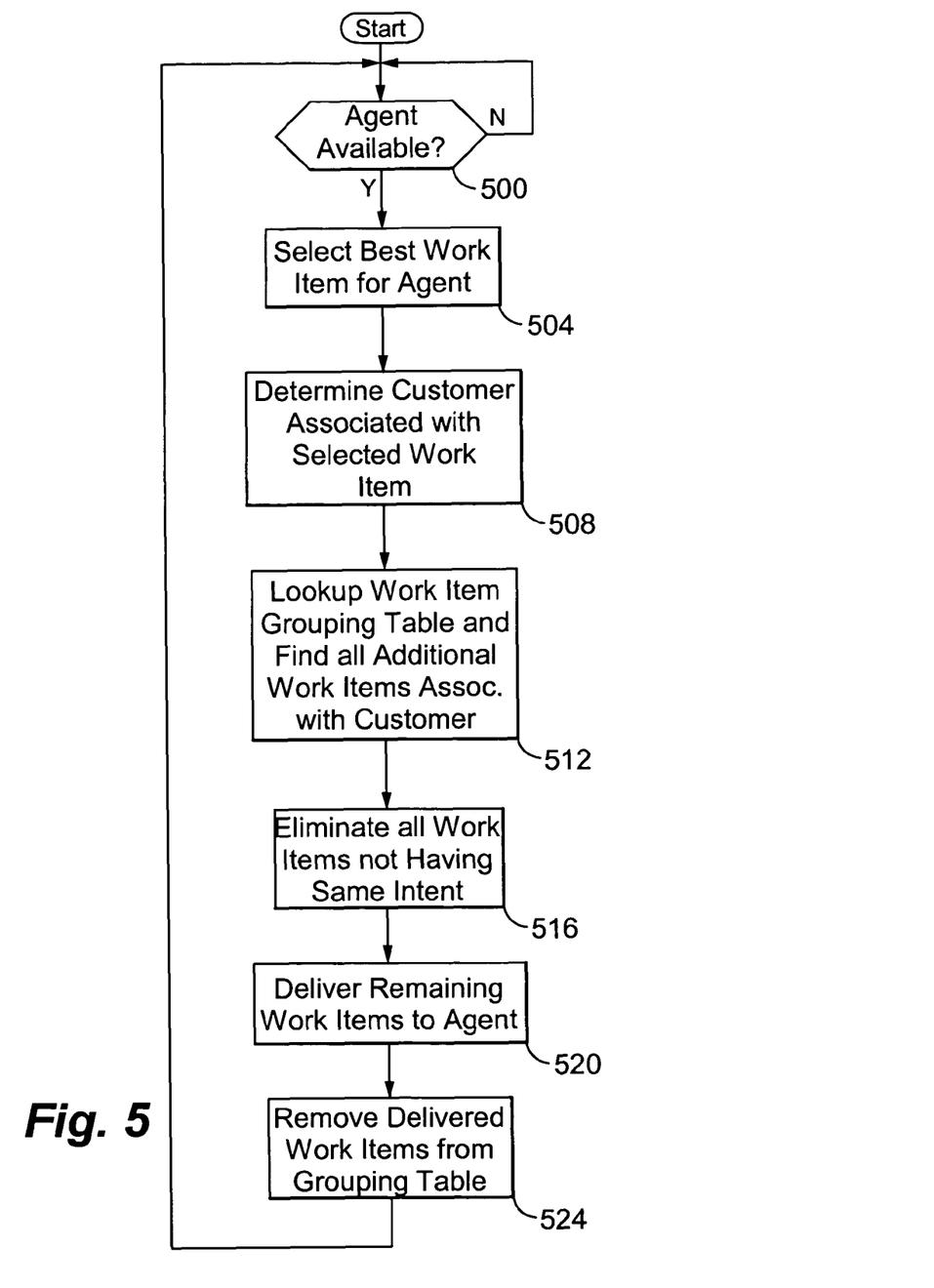
FIG. 5 is a flow chart depicting an operational embodiment of the agent and work item selector according to yet another embodiment of the present invention.

Although the steps of FIG. 5 are discussed with reference to customer identity, it is to be understood that the present invention is not limited to work item grouping based solely on customer identity. One or more other qualifiers may be used in lieu of or in addition to customer identity in work item delivery.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

In another embodiment, the existence and/or characteristics of the pending work item groupings is/are considered in step 504 when the selector 220 selects the "best" work item for servicing by the available agent. The existence and/or characteristics can be a factor among many factors used in assigning work items to available agents. Examples of relevant characteristics of a work item grouping used in step 504 include the number and type(s) of work items in a grouping, the queue priorities of the members of the grouping, and the like. To illustrate this embodiment assume that first and second work items are available at the heads of different queues for servicing by the same multi-skilled agent, that the first work item is part of a first work item grouping having seven members, and that the second work item of no work item grouping. The most efficient and cost effective work item assignment is to assign the first work item to the same agent along with the other members of the first work item grouping.

In yet another embodiment, one or more work item attributes other than qualifier can be employed in addition to or in lieu of qualifiers.

In yet another alternative embodiment, a number of work items from different customers are placed in a same grouping. The grouping is used as the basis of a group chat when the agent is available. A group chat is similar to a chat room in which a single agent services simultaneously communications from multiple customers.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   a processor receiving a first work item, the first work item having a selected qualifier;
   the processor receiving a second work item, the second work item having the selected qualifier, wherein the selected qualifier is at least one of customer identity, intent, media type, subject, and transaction identifier, wherein the first work item is a real-time contact and the second item is a non-real-time contact;
   the processor selecting the first work item for servicing by a contact center resource;
   the processor determining, based on the selected qualifier, that the first work item is related to the second work item;
   in response to determining that the first work item is related to the second work item, the processor creating, for servicing by the contact center resource, a first work item grouping comprising the first and second work items; and
   the processor delivering the first work item grouping, which contains the first work item and the second work item, to a selected common contact center resource, wherein, when the selected common contact center resource services the first work item grouping, the selected common contact center resource services the first work item and the second work item simultaneously or near simultaneously.

2. The method of claim 1, wherein the selected qualifier is customer identity, wherein the first and second work items are discrete from one another, wherein the first work item is a live voice call, wherein the second work item is one of an email, a facsimile, and a voice message, and wherein the determining step comprises:
   the processor determining whether the first work item and the second work item have the selected qualifier in common; and
   applying the following rules;
      when the first work item and the second work item have the selected qualifier in common, grouping the first work item with the second work item for servicing; and
      when the first work item and the second work item do not have the selected qualifier in common, not grouping the first work item with the second work item for servicing.

3. The method of claim 2, further comprising:
   the processor determining that the first work item is related to the second work item by a second selected qualifier, wherein the second selected qualifier is at least one of intent, subject, and transaction identifier; and
   in response to determining that the first work item is related to the second work item by the second selected qualifier, the processor creating, for servicing by the contact center resource, the first work item grouping.

4. The method of claim 3, wherein the first and second work items are received at different times and wherein the first and the second work items have one or more of differing intents, media types, subjects, and transaction identifiers.

5. The method of claim 1, further comprising:
   the processor determining that the first work item is related to a third work item by a second selected qualifier, wherein the second selected qualifier is intent, wherein the intent of the first and third work items is determined by at least one of the following: identifying a transaction identifier using an automated attendant such as an IVR, using text searching through the first and third work items, using an electronic address or telephone number inputted by the customer, and using a Web page Universal Resource Locator ("URL") from which URL the customer requested contact center servicing, and wherein the first work item and the third work item are associated with differing customers;
   in response to determining that the first work item is related to the third work item, the processor creating for servicing by the contact center resource, a second work item grouping comprising the first work item and the third second work item; and
   the processor delivering the second work item grouping, which contains the first work item and the third work item, to the selected common contact center resource, wherein, when the selected common contact center resource services the second work item grouping, the selected common contact center resource services the first work item and the third work item simultaneously or near simultaneously.

6. The method of claim 1, further comprising:
   the processor determining that the first work item is related to a third work item by a second selected qualifier, wherein the second selected qualifier is media type and wherein the first work item and the third work item are associated with differing customers;
   in response to determining that the first work item is related to the third work item, the processor creating for servicing by a contact center resource, a second work item grouping comprising the first work item and the third second work item; and
   the processor delivering the second work item grouping, which contains the first work item and the third work item, to the selected common contact center resource, wherein, when the selected common contact center resource services the second work item grouping, the selected common contact center resource services the first work item and the third work item simultaneously or near simultaneously.

7. The method of claim 1, further comprising:
   the processor determining that the first work item is related to a third work item by a second selected qualifier, wherein the second selected qualifier is subject and wherein the first work item and the third work item are associated with differing customers;
   in response to determining that the first work item is related to the third work item, the processor creating for servicing by a contact center resource, a second work item grouping comprising the first work item and the third second work item; and
   the processor delivering the second work item grouping, which contains the first work item and the third work item, to the selected common contact center resource, wherein, when the selected common contact center resource services the second work item grouping, the selected common contact center resource services the first work item and the third work item simultaneously or near simultaneously.

8. The method of claim 1, further comprising:
   the processor determining that the first work item is related to a third work item by a second selected qualifier, wherein the second selected qualifier is transaction identifier and wherein the first work item and the third work item are associated with differing contactors;

in response to determining that the first work item is related to the third work item, the processor creating for servicing by a contact center resource, a second work item grouping comprising the first work item and the third second work item; and the processor delivering the second work item grouping, which contains the first work item and the third work item, to the selected common contact center resource, wherein, when the selected common contact center resource services the second work item grouping, the selected common contact center resource services the first work item and the third work item simultaneously or near simultaneously.

9. The method of claim 1, wherein the determining step is performed in the time between the first work item being received by the contact center and the first work item reaching the head of a queue to which the first work item is assigned, wherein the contact center resource is a human agent, and wherein the human agent has the option to process only the first work item and cause the second work item to requeued for later service by another contact center resource.

10. The method of claim 1, wherein the determining step is performed when the first work item reaches the head of a queue to which the first work item is assigned.

11. The method of claim 1, wherein the first work item is simultaneously a member of the first work item grouping and a second work item grouping, wherein the members of the first work item grouping have a first qualifier in common, wherein the members of the second work item grouping have a second qualifier in common, and wherein the first and second qualifiers are different.

12. The method of claim 1, wherein the first and a second work item grouping are simultaneously eligible to be assigned to the contact center resource for servicing, wherein the first and second work item groupings each comprise a plurality of related work items, and wherein the processor selects the first work item grouping for delivery to the contact center resource based on at least one of a number and type(s) of member work items in the first and second work item groupings and queue priorities of the members of the first and second work item groupings.

13. A method, comprising:
a processor selecting a first work item for servicing by a contact center resource;
the processor analyzing the first work item to search for a customer identity, associated with the first work item;
the processor searching for a second work item having the same customer identity, wherein the first and second work items are discrete contacts;
the processor determining that the first work item and the second work item are associated with the same customer;
the processor grouping together the first work item and the second work item into a first work item grouping, in a work item grouping table, for servicing by a common contact center resource; and
the processor delivering the first work item grouping to the common contact center resource, wherein the common contact resource services the first work item and the second work item, in the first work item grouping, simultaneously or near simultaneously.

14. The method of claim 13, wherein the first and second work items were received by different communication media, wherein the determining step is performed in the time between the first work item being received by the contact center and the first work item reaching the head of a queue to which the first work item is assigned, and wherein the first and second work items are received at different times.

15. The method of claim 13, wherein the first work item is a voice call, wherein the second work item is one of an email, a facsimile, a voice message, an instant message, and a Web chat, and wherein the determining step is performed when the first work item reaches the head of a queue to which the first work item is assigned.

16. The method of claim 13, wherein the first work item is simultaneously a member of the first work item grouping and a second work item grouping, wherein the members of the first work item grouping have the customer identity in common, wherein the members of the second work item grouping have a different second qualifier in common, wherein the first and second work item groupings are eligible, at the same time, to be assigned to the contact center resource for servicing, wherein the first and second work item groupings each comprise a plurality of related work items, and wherein the processor selects the first work item grouping for delivery to the contact center resource based on at least one of a number and type(s) of member work items in the first and second work item groupings and queue priorities of the members of the first and second work item groupings.

17. The method of claim 13, wherein the first work item is a live voice call and the second work item is one of an email, voice mail, and an instant message.

18. The method of claim 13, wherein the first and second work items have a common second qualifier, wherein the second qualifier is intent, and wherein the method further comprises: when the first work item has a different intent from a third work item associated with the same customer, excluding the third work item from the first work item grouping in the work item grouping table.

19. A contact center, comprising:
a memory operable to store computer-executable instructions;
a processor in communication with the memory, the processor operable to read and execute the computer-executable instructions, wherein the computer-executable instructions cause the processor to execute modules, wherein the modules comprise:
a grouping agent module operable to:
(a) select a first work item for servicing by a contact center resource;
(b) analyze the first work item to identify a customer identity;
(c) search for a second work item having the customer identity;
(d) determine that the first work item is related to at least the second work item by the customer identity; and
(e) in response to determining that the first work item is related to the second work item, create, for servicing by the contact center resource, a first work item grouping comprising the first and second work items, wherein the first work item and the second work item are different contacts from a customer having the customer identity.

20. The contact center of claim 19, wherein the first work item is a live voice call, wherein the second work item is one of an email, a facsimile, a voice message, an instant message, and a Web chat, and further comprising when the first work item and the at least a second work item do not have the customer identity in common, the grouping agent module does not form a work item grouping for the first work item and the second work item.

21. The contact center of claim 20, wherein the grouping agent module determines that the first work item is related to the second work item by a second selected qualifier, wherein the second selected qualifier is at least one of intent, media type, subject, and transaction identifier and wherein members of the first work item grouping are related by customer identity and the at least one of intent, media type, subject, and transaction identifier.

22. The contact center of claim 21, wherein the first work item and the second work item are associated with one or more of differing intents, media types, subjects, and transaction identifiers.

23. The contact center of claim 19, further comprising:
the grouping agent module determining that the first work item is related to a third work item by a second qualifier, wherein the second qualifier is intent wherein the intent of the first and third work items is determined by at least one of the following: identifying a transaction identifier using an automated attendant such as an IVR, using text searching through the first and third work items, using an electronic address or telephone number inputted by the customer, and using a Web page Universal Resource Locator ("URL") from which URL the customer requested contact center servicing, and wherein the first work item and the third work item are associated with differing customers; and
in response to determining that the first work item is related to the third work item, the grouping agent module creating for servicing by the contact center resource, a second work item grouping comprising the first work item and the third second work item.

24. The contact center of claim 19, further comprising:
the grouping agent module determining that the first work item is related to a third work item by a second qualifier, wherein the second qualifier is media type and wherein the first work item and the third work item are associated with differing customers; and
in response to determining that the first work item is related to the third work item, the grouping agent module creating for servicing by the contact center resource, a second work item grouping comprising the first work item and the third second work item.

25. The contact center of claim 19, further comprising:
the grouping agent module determining that the first work item is related to a third work item by a second qualifier, wherein the second qualifier is subject and wherein the first work item and the third work item are associated with differing customers; and
in response to determining that the first work item is related to the third work item, the grouping agent module creating for servicing by the contact center resource, a second work item grouping comprising the first work item and the third second work item.

26. The contact center of claim 19, further comprising:
the grouping agent module determining that the first work item is related to a third work item by a second qualifier, wherein the second qualifier is transaction identifier and wherein the first work item and the third work item are associated with differing contactors; and
in response to determining that the first work item is related to the third work item, the grouping agent module creating for servicing by the contact center resource, a second work item grouping comprising the first work item and the third second work item.

27. The contact center of claim 19, wherein the first work item is simultaneously a member of the first work item grouping and a second work item grouping and wherein members of the first work item grouping and members of the second work item grouping have different qualifiers in common, wherein the first and second work item groupings are eligible, at the same time, to be assigned to the contact center resource for servicing, wherein the first and second work item groupings each comprise a plurality of related work items, and wherein the processor selects the first work item grouping for delivery to the contact center resource based on at least one of a number and type(s) of member work items in the first and second work item groupings and queue priorities of the members of the first and second work item groupings.

28. The contact center of claim 19, further comprising:
a selector module operable to:
select the first work item as a best work item for a common contact center resource;
determine the customer identity associated with the first work item;
look up the customer identity in a work item table having stored the first work item grouping;
find the first work item grouping associated with the customer identity; and
deliver the first work item grouping to the agent, wherein, by receiving the first work item grouping, the agent receives the first work item and the second work item substantially simultaneously for servicing.

29. The method of claim 4, wherein the first work item and the second work item are received by different channels.

30. The method of claim 5, wherein the customer identity is determined by one or more of text searching, destination electronic address, Universal Resource Locator or URL from which a customer initiated the first and/or second work item.

31. The method of claim 1, wherein the first work item and the second work item have a second selected qualifier in common, wherein the second selected qualifier is at least one of intent, media type, and subject, wherein the first work item and the second work item have different contactors, and wherein the common contact center resource services simultaneously the first work item and the second work item in one or more of a group chat and chat room.

32. The contact center of claim 19, wherein the first work item and a third work item have a second selected qualifier in common, wherein the selected qualifier is at least one of intent, media type, and subject, wherein the first work item and the third work items involve different contactors, and wherein the common contact center resource services simultaneously the first work item and the third work item in one or more of a group chat and chat room.

33. A contact center, comprising:
a work item grouping table operable to store work item groupings;
a grouping agent in communication with the work item grouping table operable to:
select a first work item for servicing by a contact center resource;
analyze the first work item for a selected qualifier;
determine that the first work item is related to at least a second work item by the selected qualifier, wherein the selected qualifiers is at least one of customer identity, intent, media type, subject, and transaction identifier and wherein the first work item is a real-time contact and the at least a second work item is a non-real-time contact; and
create, in the work item grouping table and for servicing by the contact center resource, a first work item grouping, wherein the first work item and the second work item are members of the first work item grouping;

a selector in communication with the work item grouping table operable to:
    select the first work item grouping as a best work item for servicing by an available agent; and
    deliver the first work item grouping to the agent, wherein the agent receives the first work item and the second work item substantially simultaneously or near simultaneously for servicing.

34. The contact center of claim 33, wherein, in the determining function, the grouping agent determines whether the first work item and the at least a second work item have a first and a second selected qualifier in common; when the first work item and the at least a second work item have a first and a second selected qualifier in common, forms a work item grouping for the first work item and the at least a second work item; and when the first work item and the at least a second work item do not have a first and a second selected qualifier in common, does not form a work item grouping for the first work item and the at least a second work item and wherein the selected qualifier is at least one of customer identity, intent, media type, subject, and transaction identifier.

35. The contact center of claim 33, wherein the first work item is a live voice call, wherein the at least one of a second work item is one or more of an email and voice message, wherein the first and second work items are discrete contacts, wherein the first selected qualifier is customer identity, and wherein the first and the at least a second work items involve different media types.

36. The contact center of claim 33, wherein the first selected qualifier is at least one of intent, subject, and media type and wherein the first and the at least a second work items involve different contactors.

37. The contact center of claim 28, wherein a presence of the first work item grouping is a factor used by the selector in preferentially selecting, for servicing by the resource, the first work item over a third work item unrelated to the first work item.

* * * * *